(12) United States Patent
Pan et al.

(10) Patent No.: US 8,611,052 B1
(45) Date of Patent: Dec. 17, 2013

(54) SYSTEMS AND METHODS FOR ALIGNING COMPONENTS OF A HEAD STACK ASSEMBLY OF A HARD DISK DRIVE

(75) Inventors: Tzong-Shii Pan, San Jose, CA (US); Shufun Ho, Fremont, CA (US)

(73) Assignee: Western Digital Technologies, Inc., Irvine, CA (US)

( * ) Notice: Subject to any disclaimer, the term of this patent is extended or adjusted under 35 U.S.C. 154(b) by 88 days.

(21) Appl. No.: 13/431,660

(22) Filed: Mar. 27, 2012

(51) Int. Cl.
*G11B 5/55* (2006.01)

(52) U.S. Cl.
USPC ...................................................... 360/264.2

(58) Field of Classification Search
USPC ...................................................... 360/264.2
See application file for complete search history.

(56) References Cited

U.S. PATENT DOCUMENTS

| | | |
|---|---|---|
| 4,714,435 A | 12/1987 | Stipanuk et al. |
| 5,348,488 A | 9/1994 | Green et al. |
| 5,415,555 A | 5/1995 | Sobhani |
| 5,422,764 A | 6/1995 | McIlvanie |
| 5,612,841 A | 3/1997 | Johnson |
| 5,631,786 A | 5/1997 | Erpelding |
| 5,668,684 A | 9/1997 | Palmer et al. |
| 5,827,084 A | 10/1998 | Biernath |
| 5,903,413 A | 5/1999 | Brooks, Jr. et al. |
| 5,920,465 A | 7/1999 | Tanaka |
| 5,947,750 A | 9/1999 | Alcoe et al. |
| 6,007,669 A | 12/1999 | Crumly et al. |
| 6,134,770 A | 10/2000 | Heeren et al. |
| 6,145,188 A | 11/2000 | Brooks, Jr. et al. |
| 6,185,075 B1 | 2/2001 | Tsujino et al. |
| 6,212,046 B1 | 4/2001 | Albrecht et al. |
| 6,360,426 B1 | 3/2002 | Summers et al. |
| 6,367,144 B1 | 4/2002 | Holaway et al. |
| 6,386,434 B1 | 5/2002 | Wong |
| 6,399,889 B1 | 6/2002 | Korkowski et al. |
| 6,529,350 B1 | 3/2003 | Itoh |
| 6,634,086 B2 | 10/2003 | Korkowski et al. |
| 6,672,879 B2 | 1/2004 | Neidich et al. |
| 6,757,136 B2 | 6/2004 | Buske et al. |
| 6,758,686 B2 | 7/2004 | Burdick |
| 6,765,763 B2 | 7/2004 | SeeToh et al. |
| 7,059,868 B1 | 6/2006 | Yan |
| 7,110,222 B2* | 9/2006 | Erpelding ................ 360/264.2 |
| 7,414,814 B1 | 8/2008 | Pan |
| 7,482,800 B2 | 1/2009 | Ooyabu et al. |
| 7,522,382 B1 | 4/2009 | Pan |
| 7,525,767 B2* | 4/2009 | Erpelding ................ 360/264.2 |
| 7,538,981 B1* | 5/2009 | Pan ........................... 360/264.2 |
| 7,760,470 B2 | 7/2010 | Wu et al. |
| 7,907,369 B1 | 3/2011 | Pan |
| 8,064,170 B1* | 11/2011 | Pan .......................... 360/264.2 |
| 8,068,314 B1* | 11/2011 | Pan et al. ................. 360/264.2 |
| 8,279,560 B1 | 10/2012 | Pan |
| 2001/0021596 A1 | 9/2001 | Tamura |
| 2004/0228039 A1 | 11/2004 | Wu et al. |

(Continued)

*Primary Examiner* — Mark Blouin

(57) ABSTRACT

Embodiments of the present invention relate to an alignment comb and a subassembly of a head stack assembly for a hard disk drive using the alignment comb. The subassembly includes a flexible printed circuit (FPC) having a plurality of first apertures, a flexure configured to be coupled to the FPC, the flexure having a second aperture configured to overlap a corresponding one of the first apertures, and an alignment comb including a plurality of fingers configured to align the FPC with the flexure, the plurality of fingers being spaced apart in a first direction and a finger of the plurality of fingers configured to extend into the corresponding one of the first apertures and the second aperture.

28 Claims, 10 Drawing Sheets

(56) References Cited

U.S. PATENT DOCUMENTS

| | | |
|---|---|---|
| 2005/0042894 A1 | 2/2005 | Wu et al. |
| 2005/0237672 A1 | 10/2005 | Kamigama et al. |
| 2005/0243472 A1 | 11/2005 | Kamigama et al. |
| 2007/0075056 A1 | 4/2007 | Ho et al. |
| 2007/0153427 A1 | 7/2007 | Izumi et al. |
| 2007/0279807 A1 | 12/2007 | Kobayashi et al. |
| 2008/0225439 A1 | 9/2008 | Komura |

\* cited by examiner

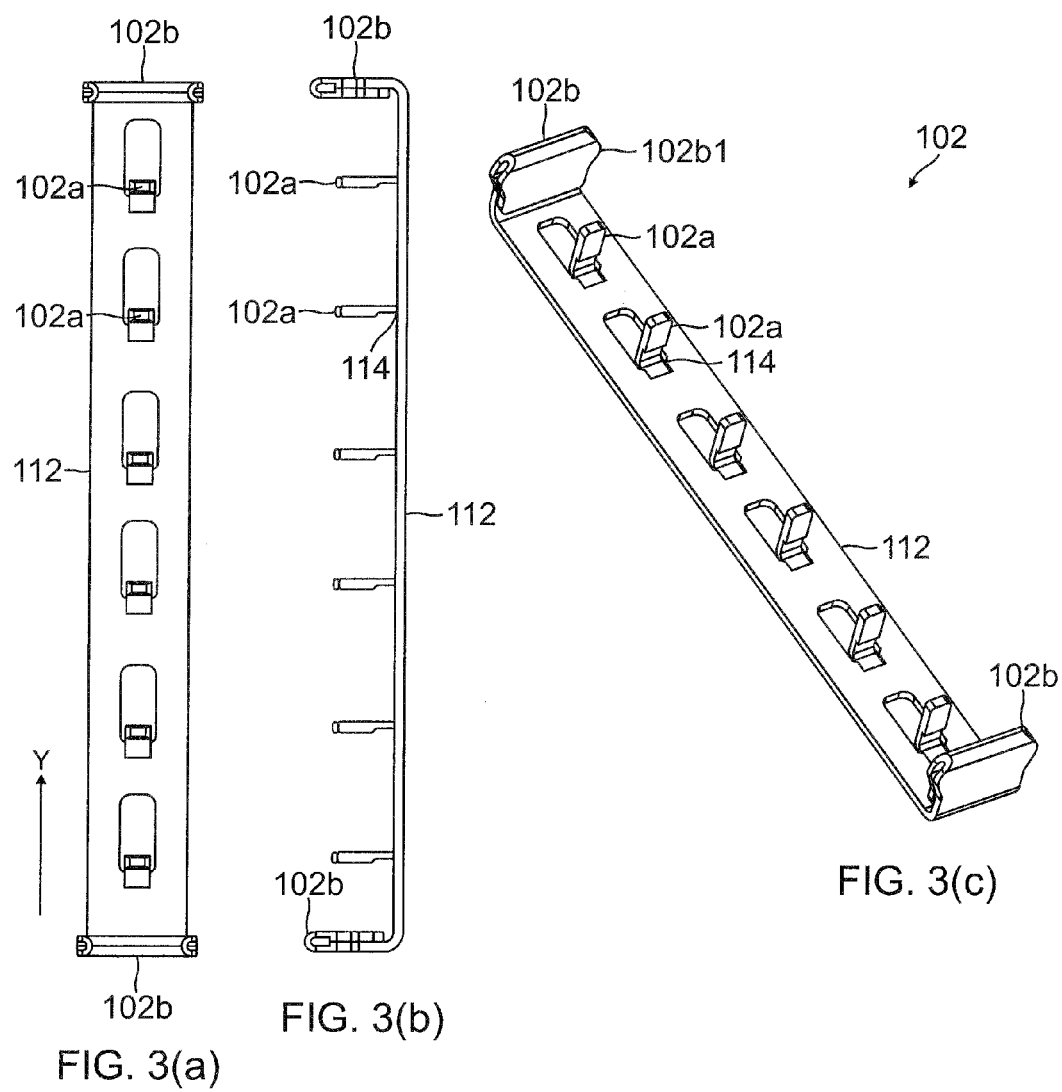

SYSTEMS AND METHODS FOR ALIGNING COMPONENTS OF A HEAD STACK ASSEMBLY OF A HARD DISK DRIVE

FIELD

The present invention generally relates to the assembly of a hard disk drive, and, in particular, to systems and methods for aligning components of a head stack assembly of a hard disk drive.

BACKGROUND

Information storage devices are used to retrieve and/or store data in computers and other consumer electronics devices. A magnetic hard disk drive is an example of an information storage device that includes one or more heads that can both read and write from one or more rotating storage media. In the magnetic hard disk drive, each head is a sub-component of a head-gimbal assembly (HGA) that typically includes a laminated flexure to carry electrical signals to and from the head. The HGA, in turn, is a sub-component of a head-stack assembly (HSA) that typically includes one or more HGAs, an actuator, and a flexible printed circuit (FPC). The one or more HGAs are attached to various arms of the actuator.

Each of the laminated flexures typically includes electrically conductive traces (e.g., copper traces) that are isolated from a stainless steel structural layer by a dielectric layer such as a polyimide layer, and the conductive traces transfer signals between the head and the FPC on the actuator body. Each HGA flexure has a suspension tail or tail portion that is attached to the FPC located adjacent the actuator body. That is, the conductive traces extend from adjacent the head and continue along the flexure to electrical connection points (or pads) located at the suspension tail of the flexure. The FPC includes a number of conductive electrical terminals (or bond pads) that correspond to the electrical connection points on the suspension tail of the flexure.

To facilitate electrical connection of the conductive traces of the flexures to the conductive electrical terminals of the FPC during an HSA manufacturing process, the flexures are first properly positioned relative to the FPC so that the connection points on the tails of the flexures are aligned with the conductive electrical terminals of the FPC. Then, the flexures are held or constrained against the conductive electrical terminals of the FPC while the electrical connections are made by a suitable method (e.g., by ultrasonic bonding, solder jet bonding, solder bump reflow, or anisotropic conductive film bonding).

In a high-volume manufacturing environment like the very competitive information storage device industry, there is a practical need for a fast and cost-effective way of accurately aligning the flexures with the FPC.

SUMMARY

Aspects of embodiments according to the present invention are directed to a subassembly of a head stack assembly (HSA) for a hard disk drive, a method of assembling the subassembly, an alignment comb for aligning flexures of the HSA, and a method of fabricating the alignment comb.

According to an embodiment of the present invention, a subassembly of a head stack assembly for a hard disk drive is provided. The subassembly includes a flexible printed circuit (FPC) having a plurality of first apertures; a flexure configured to be coupled to the FPC, the flexure having a second aperture configured to overlap a corresponding one of the first apertures; and an alignment comb including a plurality of fingers configured to align the FPC with the flexure, the plurality of fingers being spaced apart in a first direction and a finger of the plurality of fingers configured to extend into the corresponding one of the first apertures and the second aperture.

According to one aspect of the embodiment, each of the plurality of fingers may be retained in the second aperture by an interference fit.

According to one aspect of the embodiment, a width of the second aperture in the first direction may be smaller than a width of a corresponding one of the plurality of fingers.

According to one aspect of the embodiment, the alignment comb may include an elongated body extending in the first direction, a first tab protrusion at a proximal end of the elongated body, and a second tab protrusion at a distal end of the elongated body, wherein the first tab protrusion and the second tab protrusion may protrude from the elongated body in a second direction that is substantially perpendicular to the first direction, and the plurality of fingers may protrude from the elongated body between the first tab protrusion and the second tab protrusion in the second direction.

According to one aspect of the embodiment, thicknesses of the first tab protrusion and the second tab protrusion may be larger than a thickness of the elongated body.

According to one aspect of the embodiment, each of the plurality of fingers may be connected to the elongated body via a bend portion, and the bend portion has a thickness less than that of the elongated body.

According to one aspect of the embodiment, the FPC may have a plurality of third apertures, and the first tab protrusion and the second tab protrusion may be respectively inserted into the third apertures, and the plurality of third apertures may be configured to retain the first tab protrusion and the second tab protrusion therein.

According to one aspect of the embodiment, the flexure may include a plurality of flexures spaced apart in the first direction, each including a second aperture configured to overlap a corresponding one of the first apertures.

According to one aspect of the embodiment, the plurality of fingers may have substantially a same shape and may be oriented in a second direction substantially perpendicular to the first direction.

According to one aspect of the embodiment, the alignment comb may include an elongated body extending in the first direction, and the plurality of fingers are formed by protruding tabs of the elongated body bent toward the second direction.

According to one aspect of the embodiment, each of the plurality of fingers may have a thickness between about 50 μm to about 200 μm, inclusive. In one embodiment, each of the plurality of fingers may have a thickness of about 100 μm.

According to one aspect of the embodiment, the subassembly further includes a support member between the FPC and the alignment comb, the support member having a plurality of third apertures corresponding in position to the first apertures and the second aperture.

According to one aspect of the embodiment, the alignment comb may include metal. The alignment comb may include stainless steel.

According to one aspect of the embodiment, the subassembly may further include a rotary actuator assembly including a body portion, wherein the body portion has a cavity configured to receive the alignment comb.

According to an embodiment of the present invention, a method for assembling a subassembly of a head stack assembly for a hard drive is provided. The method includes positioning a flexible printed circuit (FPC) having a plurality of first apertures relative to an alignment comb including a plurality of fingers that are spaced apart in a first direction and correspond in position to the first apertures; extending a finger of the plurality of fingers into a corresponding one the plurality of first apertures from a first side of the FPC; positioning a flexure on a second side of the FPC opposite the first side, the flexure having a second aperture configured to overlap the corresponding one of the first apertures; and aligning the position of the flexure relative to the FPC in the first direction by extending the finger into the second aperture.

According to one aspect of the embodiment, the method further includes placing a support member between the FPC and the alignment comb, the support member having a plurality of third apertures corresponding in position to the first apertures and the second aperture. The flexure may include a plurality of flexures spaced apart in the first direction, and the extending a corresponding one of the plurality of fingers into the second aperture may include extending each of the plurality of fingers into a corresponding one of the first apertures, a corresponding one of the second apertures, and a corresponding one of the third apertures.

According to one aspect of the embodiment, the corresponding one of the plurality of fingers may be retained in the second aperture by an interference fit.

According to one aspect of the embodiment, a width of the second aperture in the first direction may be smaller than a width of the corresponding one of the plurality of fingers.

According to one aspect of the embodiment, the method may further include attaching the subassembly to a rotary actuator assembly including a body portion, wherein the body portion has a cavity configured to receive the alignment comb.

According to one aspect of the embodiment, wherein the alignment comb may include a first tab protrusion and a second tab protrusion both extending in the same direction as the plurality of fingers in a second direction that is substantially perpendicular to the first direction, and the FPC may have a plurality of third apertures. The method may further include inserting the first tab protrusion and the second tab protrusion into the third apertures, respectively, wherein the plurality of third apertures are configured to retain the first tab protrusion and the second tab protrusion therein.

According to an embodiment of the present invention, a method for fabricating an alignment comb including a plurality of fingers spaced apart in a first direction is provided. The method includes forming a first mask on a first side of a substantially flat material, the first mask having a plurality of first apertures corresponding in position to the plurality of fingers; forming a second mask on a second side of the substantially flat material opposite the first side, the second mask having a plurality of second apertures overlapping the plurality of first apertures, wherein the first apertures and the second apertures have different shapes; and etching the substantially flat material using the first mask and the second mask to form an elongated body and a plurality of tab protrusions respectively cantilever-connected with a central portion of the elongated body, the plurality of tab protrusions being spaced apart in the first direction.

According to one aspect of the embodiment, each of the tab protrusions has a floating distal end and a proximal end connected to the elongated body, and the proximal end has a thickness that is less than that of the elongated body.

According to one aspect of the embodiment, the method may further include bending the plurality of tab protrusions at the proximal ends toward a second direction substantially perpendicular to the first direction to form the plurality of fingers.

According to one aspect of the embodiment, the first mask may have a plurality of third apertures. The method may further include etching portions of the elongated body on the first side respectively located at ends of the elongated body using the plurality of third apertures, while protecting portions of the elongated body on the second side corresponding in position to the third apertures by using the second mask.

According to one aspect of the embodiment, the method may further include bending the ends of the elongated body in opposite directions at the etched portions.

BRIEF DESCRIPTION OF THE DRAWINGS

The above and other features and aspects of the present invention will become more apparent by describing in detail embodiments thereof with reference to the attached drawings in which:

FIGS. 3(a), 3(b), and 3(c) illustrate a front view, a side view, and a perspective view, respectively, of an alignment comb according to an embodiment of the present invention.

DETAILED DESCRIPTION

Figure 1:
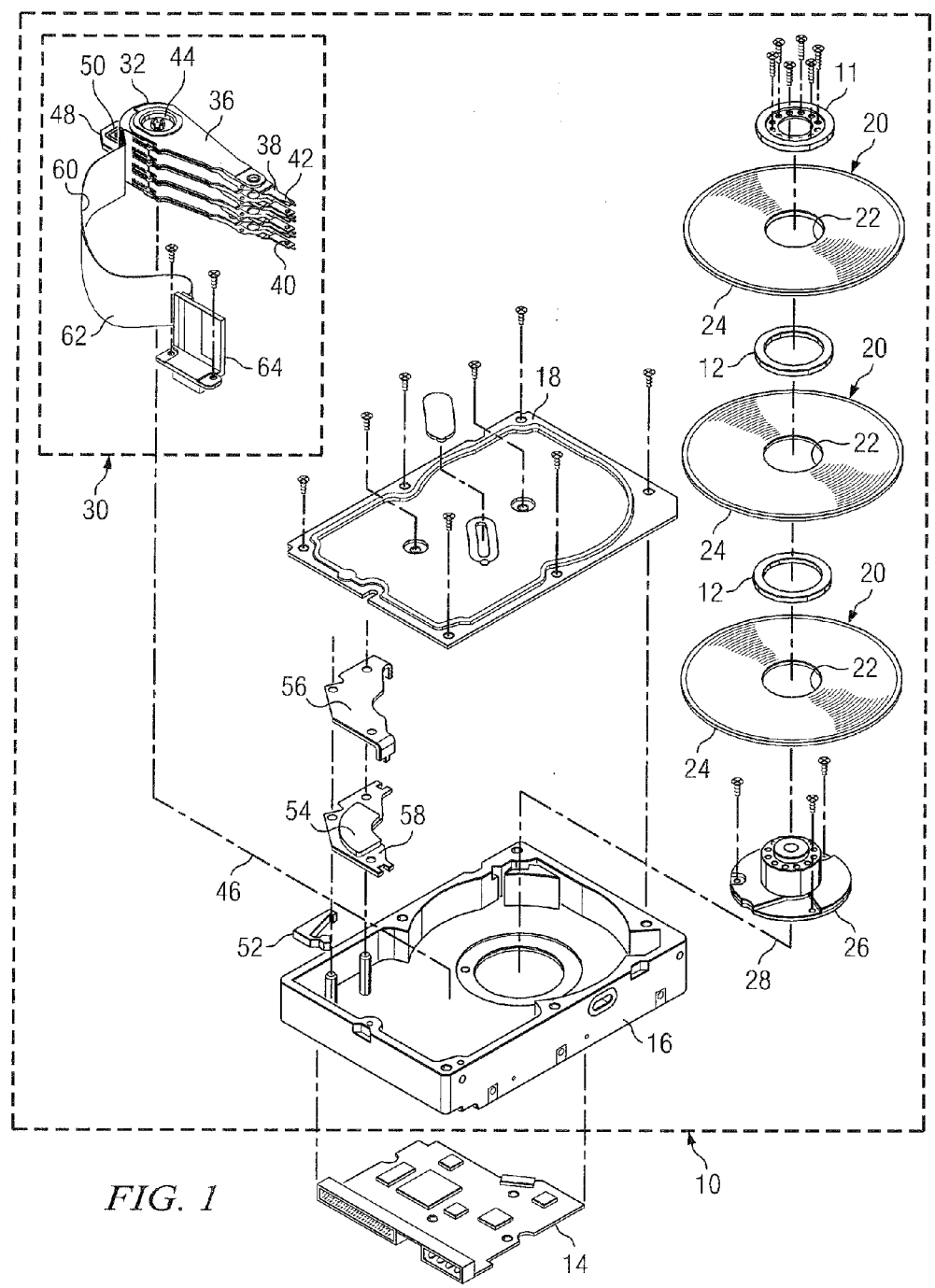
FIG. 1 is an exploded perspective view of a magnetic hard disk drive including an alignment comb for a head stack assembly according to an embodiment of the present invention.

As the present invention allows for various changes and numerous embodiments, particular embodiments will be illustrated in the drawings and described in detail in the written description. However, this is not intended to limit the present invention to particular modes of practice, and it is to be appreciated that all changes, equivalents, and substitutes that do not depart from the spirit and technical scope of the present invention are encompassed in the present invention.

Embodiments of the present invention are directed to an alignment comb that is mounted on a back side of a flexible printed circuit (FPC) to align the FPC with one or more flexures. The alignment comb has multiple alignment pins or fingers that pass through corresponding alignment apertures of the FPC and the flexures. The alignment apertures of the flexures are undersized in an alignment direction (e.g., Y-direction) so that when the alignment pins or fingers are inserted therein, an interference fit is formed to achieve the desired flexure to FPC bond pad alignment.

According to several embodiments, the FPC is positioned adjacent to the flexures. Then, the fingers of the alignment comb are extended into the alignment apertures of the FPC and the alignment apertures of the flexures. Here, the apertures of the flexures overlap the corresponding apertures of the FPC. Therefore, when the fingers of the alignment comb extend into the apertures, the FPC and the flexures are aligned. According to several embodiments, the alignment combs can be formed by using two masks respectively formed on opposite sides of a substantially flat material. The flat material is etched through the apertures of the masks on both sides to form the fingers of the alignment comb. As a result of using the two masks, the alignment comb can be formed in one etching process.

FIG. 1 is an exploded perspective view of a magnetic hard disk drive according to an embodiment of the present invention. The disk drive includes a head disk assembly (HDA) 10 and a printed circuit board assembly (PCBA) 14. The HDA 10 includes a base 16 and a cover 18 that together house at least one annular magnetic disk 20. Each disk 20 contains a number of magnetic tracks for storing data. The tracks are disposed upon opposing first and second disk surfaces of the disk 20 that extend between an inner disk edge 22 (corresponding to the inner diameter) and an outer disk edge 24 (corresponding to the outer diameter) of the disk 20. The HDA 10 further includes a spindle motor 26 for rotating the disk 20 about a disk axis of rotation 28. The spindle motor 26 includes a spindle motor hub that is rotatably attached to the base 16 of the HDA 10. The disks 20 may be stacked and separated with one or more annular disk spacers 12 that are disposed above the hub, all held fixed to the hub by a disk clamp 11.

The HDA 10 further includes a head stack assembly (HSA) 30 rotatably attached to the base 16 of the HDA 10. The HSA 30 includes an actuator comprising an actuator body 32 and one or more actuator arms 36 extending from the actuator body 32. The actuator body 32 includes a bore 44 and a pivot bearing cartridge engaged within the bore for facilitating the HSA 30 to rotate relative to the HDA 10 about an actuator pivot axis 46. One or two head gimbal assemblies (HGA) 38 are attached to a distal end of each actuator arm 36. The HSA 30 is electrically connected to the PCBA 14 via a flexible printed circuit (FPC) 60, which includes a flex cable 62 and a flex cable support bracket 64.

Figure 2A:
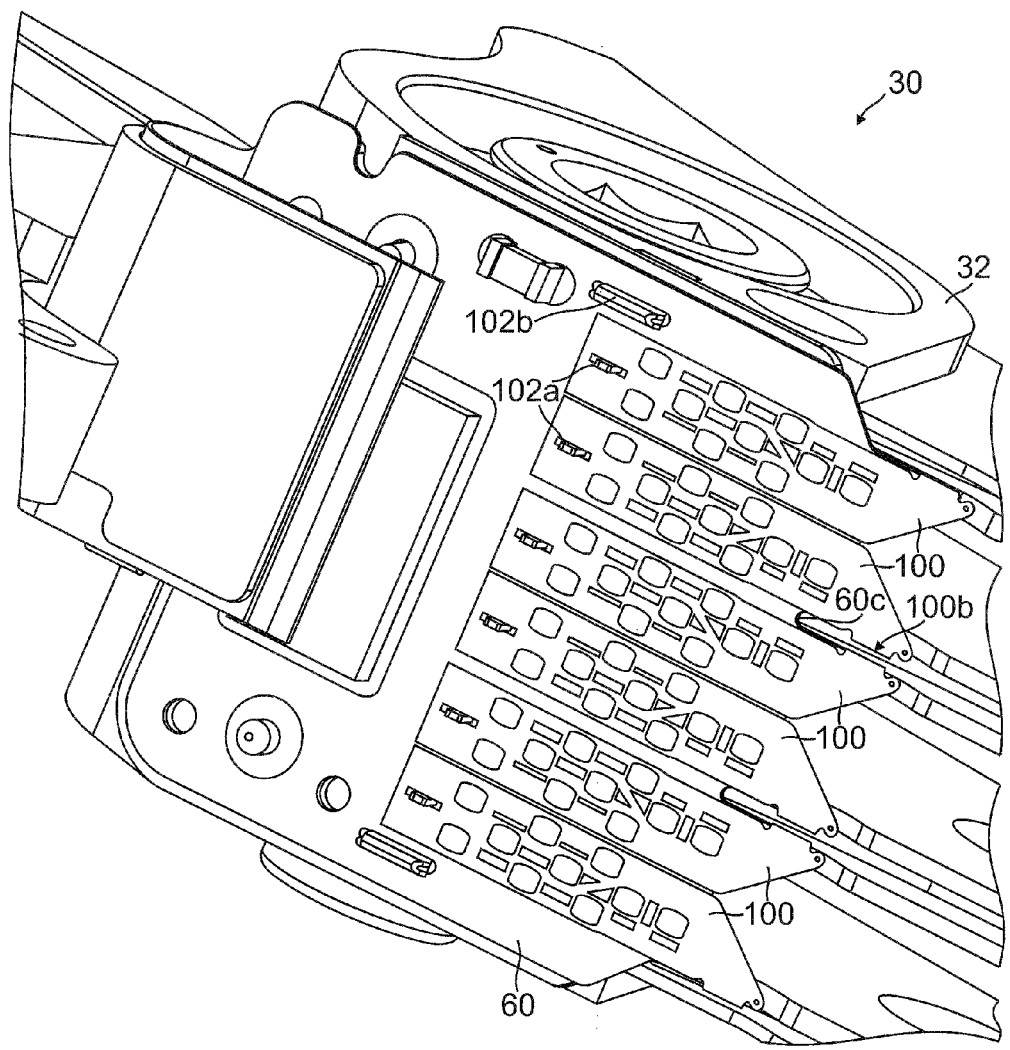
FIG. 2a is a perspective view illustrating a relevant portion of an HSA with an FPC attached with a number of flexures and an alignment comb according to an embodiment of the present invention.
Figure 2B:
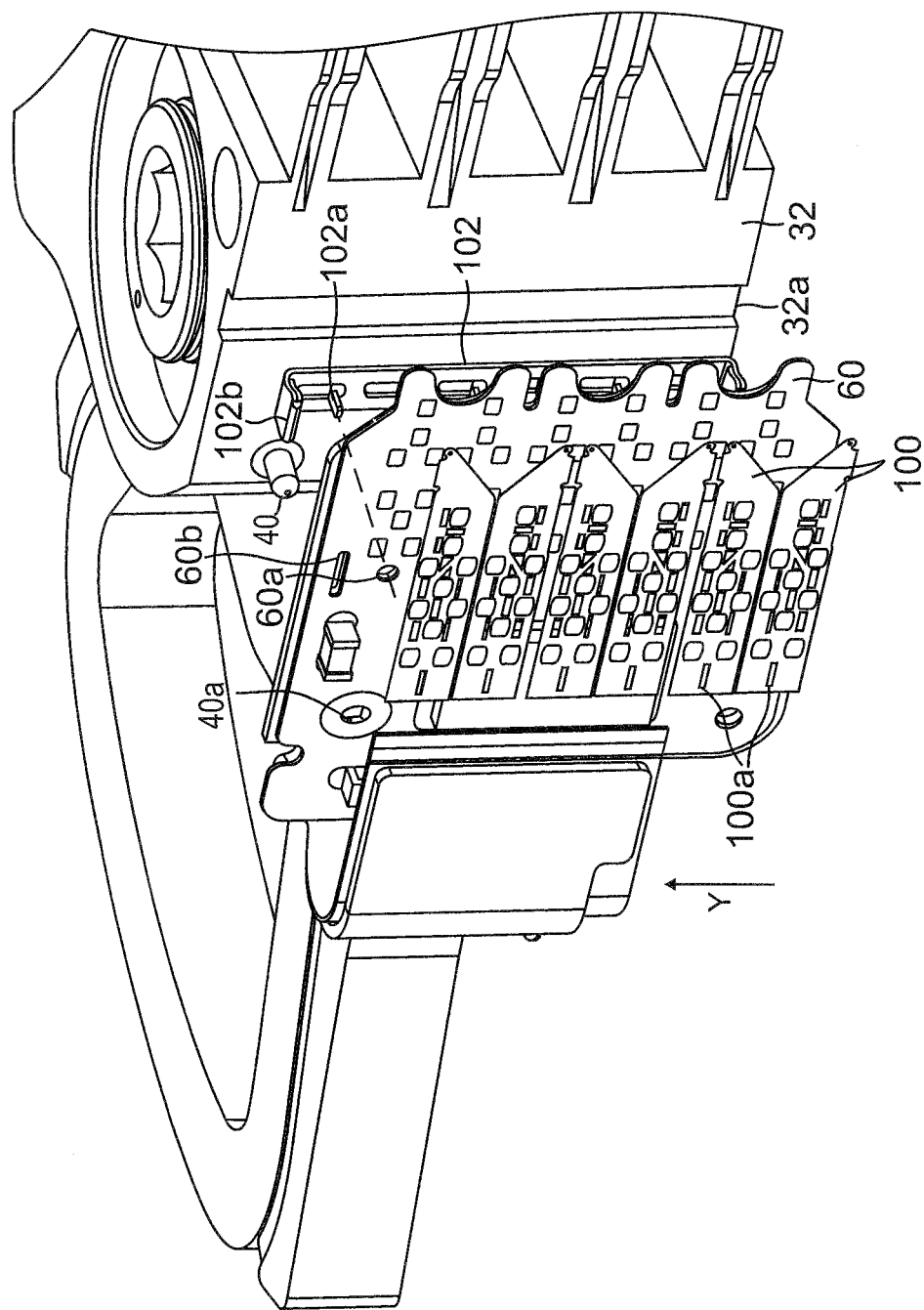
FIGS. 2b and 2c are different exploded perspective views illustrating a portion of the HSA of FIG. 2a, the FPC, the flexures, and the alignment comb according to an embodiment of the present invention.
Figure 2C:
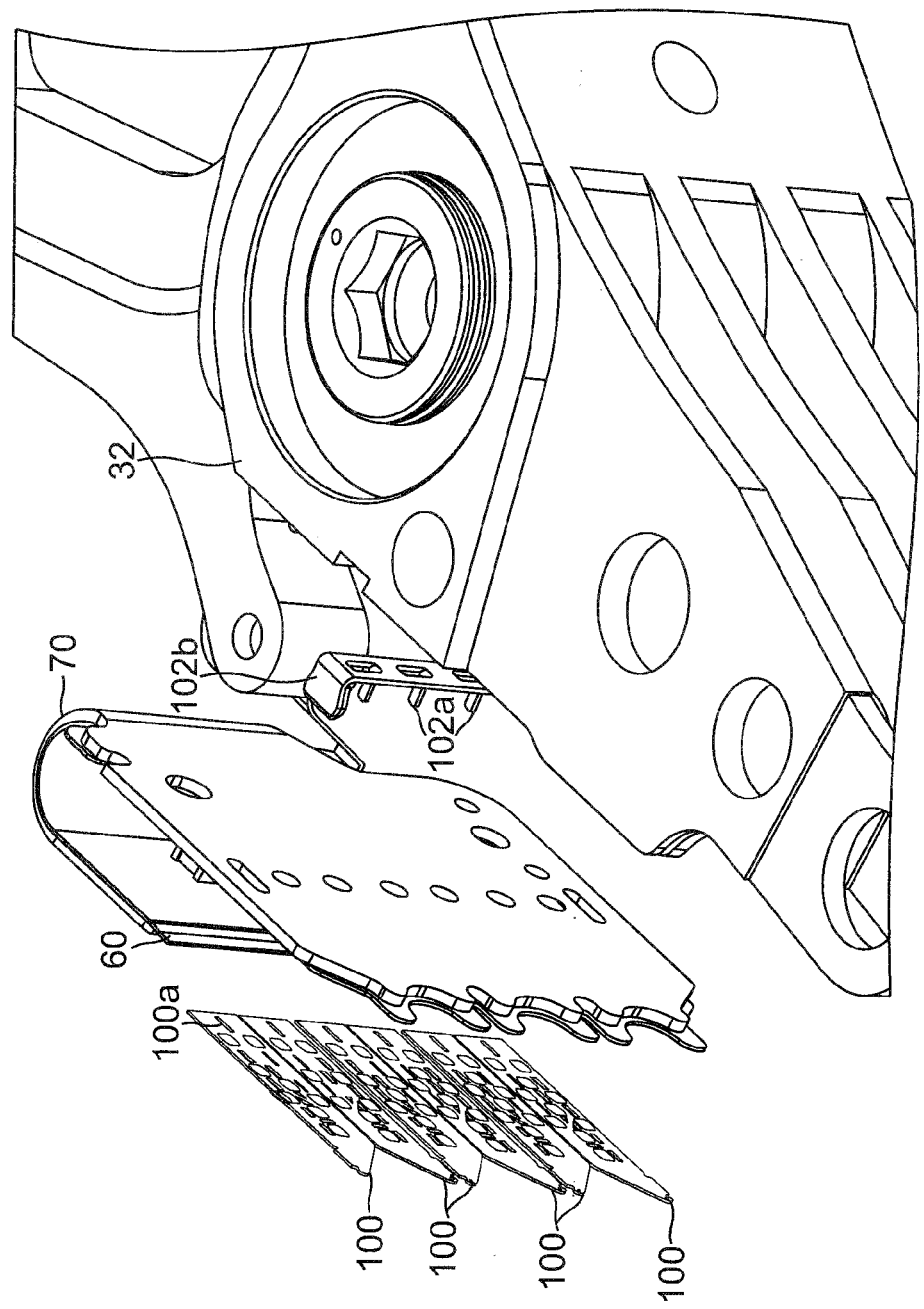

FIG. 2a is a perspective view illustrating a relevant portion of the HSA 30 with the FPC 60 attached with the tails of a number of flexures 100 according to an embodiment of the present invention. FIGS. 2b and 2c are exploded perspective views illustrating the portion of the HSA 30, the FPC 60, the flexures 100, and an alignment comb 102, from different angles. The alignment comb 102 is positioned between the actuator body 32 and the FPC 60. The actuator body 32 has a cavity 32a that is configured to receive the alignment comb 102, such that the cavity 32a provides the clearance for the alignment comb 102 when the FPC 60 is attached to the actuator body 32. The actuator body 32 has a pin 40 (see FIG. 2b) that passes through an aperture 40a (see FIG. 2b) on the FPC 60. The pin 40 and the aperture 40a can be secured together by soldering, thereby attaching the FPC 60 to the actuator body 32. The alignment comb 102 has a number of alignment fingers 102a for protruding or passing through first alignment apertures 60a of the FPC 60 and alignment apertures 100a of the flexures 100. The FPC 60 also includes second alignment apertures 60b that have, for example, a slot shape for receiving tab protrusions 102b of the alignment comb 102. That is, the first alignment apertures 60a and the second alignment apertures 60b of the FPC 60 may have different sizes and shapes. In this embodiment, the second alignment apertures 60b have a slot shape, and the first alignment apertures 60a have a round shape. The first alignment apertures 60a of the FPC 60 correspond in position to the alignment apertures 100a of the flexures 100. In one embodiment, each of the alignment apertures 100a of the flexures 100 substantially overlaps a corresponding one of the first alignment apertures 60a of the FPC 60 when the flexures 100 and the FPC 60 are positioned for alignment. However, in several embodiments, the second alignment apertures 60b may be omitted or have the same shape as the first alignment apertures 60a for different alignment comb configurations.

Figure 2D:
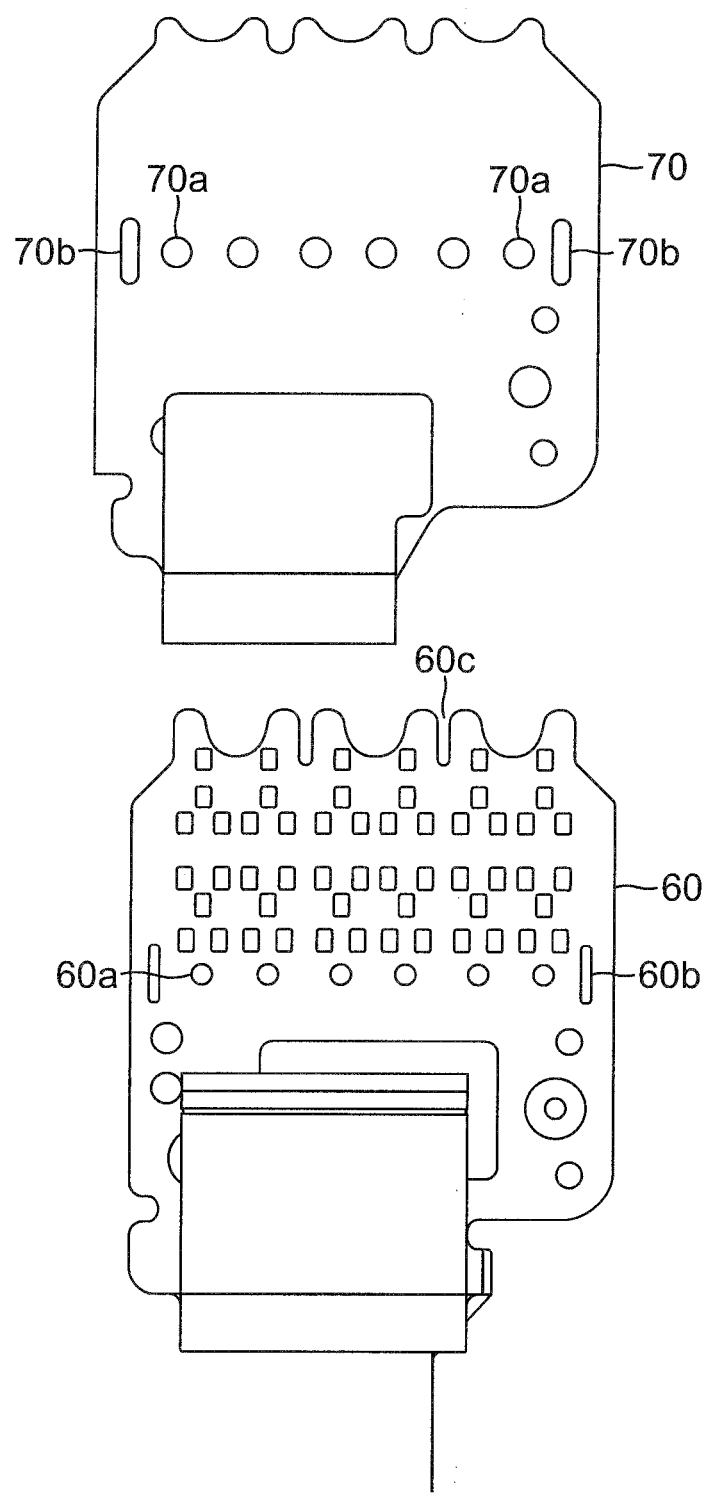
FIG. 2d is a plan view of a support member and an FPC according to an embodiment of the present invention.

In FIG. 2c, a support member 70 (e.g., stiffener) is shown to be positioned between the actuator body 32 and the FPC 60, to support the FPC 60. FIG. 2d is a drawing showing a plan view of the support member 70 and the FPC 60. The support member 70 has apertures 70a and 70b. The apertures 70a correspond in position to the apertures 100a of the flexures 100 and the first alignment apertures 60a of the FPC 60. The apertures 70b correspond in position to the second alignment apertures 60b of the FPC 60. During assembly, the fingers 102a and the tab protrusions 102b of the alignment comb 102 pass though the apertures 70a and 70b, respectively, before passing through the first and second alignment apertures 60a and 60b of the FPC 60. Then, the fingers 102a pass through the apertures 100a of the flexures 100.

During assembly, the flexures 100 may also be roughly guided by the FPC slots 60c (see FIGS. 2a and 2d) at the tail bend areas 100b (see FIG. 2a) when the flexures 100 pass through the FPC slot 60c. Then, the fingers 102a of the alignment comb 102 can be inserted through the apertures 100a of the flexures 100 such that the flexures 100 are aligned in an alignment direction (e.g., Y direction in FIG. 2b). The apertures 100a on the flexures 100 are undersized in the alignment direction to facilitate the alignment process.

FIG. 3 is a drawing illustrating a front view (a), a side view (b), and a perspective view (c) of the alignment comb 102 according to an embodiment of the present invention. The fingers 102a of the alignment comb 102 are configured to align the FPC 60 with the flexures 100. The fingers 102a are spaced apart in a first alignment direction (e.g., Y direction) and are aligned in a second alignment direction (e.g., X direction) as a column, and each of the fingers 102a is positioned such that it passes through the corresponding first alignment aperture 60a and the aperture 100a during the assembly of the HSA 30. The fingers 102a may be retained in the apertures, for example, by an interference fit or other suitable mechanisms. The alignment comb 102 has an elongated body 112 extending in a length direction (e.g., Y direction). A first tab protrusion 102b is formed at a proximal end (e.g., top tab protrusion in FIG. 3) of the elongated body, and a second tab protrusion 102b is formed at a distal end (e.g., bottom tab protrusion in FIG. 3) of the elongated body 112. The first tab protrusion and the second tab protrusion protrude from the elongated body 112 in a direction that is substantially perpendicular to the length direction of the elongated body.

The tab protrusions 102b have thicknesses larger than that of the material (e.g., a substantially flat material) for forming the alignment comb 102. Therefore, the thicknesses of the tab protrusions 102b may be larger than that of the fingers 102a. The tab protrusions 102b may be formed by double folding the ends of the alignment comb 102 in opposite directions to improve their fit into the second alignment apertures 60b on the FPC 60. The material thickness for etching economically is about 0.1 mm or less. The tab protrusions 102b have a widened feature 102b1 that is designed as a retention feature for retaining the tab protrusions 102 in place. The tab protrusions 102b are suitably sized to be inserted through the apertures 70b of the support member. In several embodiments, a punch may be used to form the apertures 70b with a punch window size of about 0.2 mm or larger. However, the present invention is not limited thereto, and the tab protrusions 102b and the fingers 102a may have other suitable shapes and thicknesses. In one embodiment, the tab protrusions 102b may be formed by folding the ends of the elongated body in opposite directions such that the tab protrusions 102b have thicknesses that are about twice the thickness of the fingers 102a or the elongated body 112.

Each of the fingers 102a extends from the elongated body 112 via a bent portion 114. The bent portion 114 has a thickness that is less than that of the elongated body 112 and the fingers 102a, such that the bent portion 114 may function as bending line to improve the forming tolerance of the fingers 102a.

The above described profiles and features of the alignment comb 102 can be chemically etched such that a high degree of accuracy may be maintained. In several embodiments, the alignment comb 102 can be fabricated with a substantially flat material having a thickness between about 50 μm to about 200 μm, inclusive. In several embodiments, the material thickness is about 0.12 mm or less. In one embodiment, the material thickness is about 100 μm. The fingers 102a of the alignment comb 102 are designed to be formed in such a way that its thickness is controlled by the tolerance of the thickness of the flat material. For example, when a cold rolled flat material (e.g., cold rolled steel with a thickness of about 100 μm) is used to form the alignment comb 102, the thickness tolerance is very tight such that the tolerance contribution (e.g., 1 μm to 2 μm) to the alignment of the fingers 102a can be minimized or reduced.

To improve the forming tolerance of the fingers 102a and the tab protrusions 102b, forming areas corresponding to the bent portions (e.g., 114) of the alignment comb 102 can be partially etched on one side of the elongated body 112 to weaken the forming areas so the forming of the fingers 102a and the tab protrusions 102b can be highly precise, and the bending radii can be well controlled.

Figure 4:
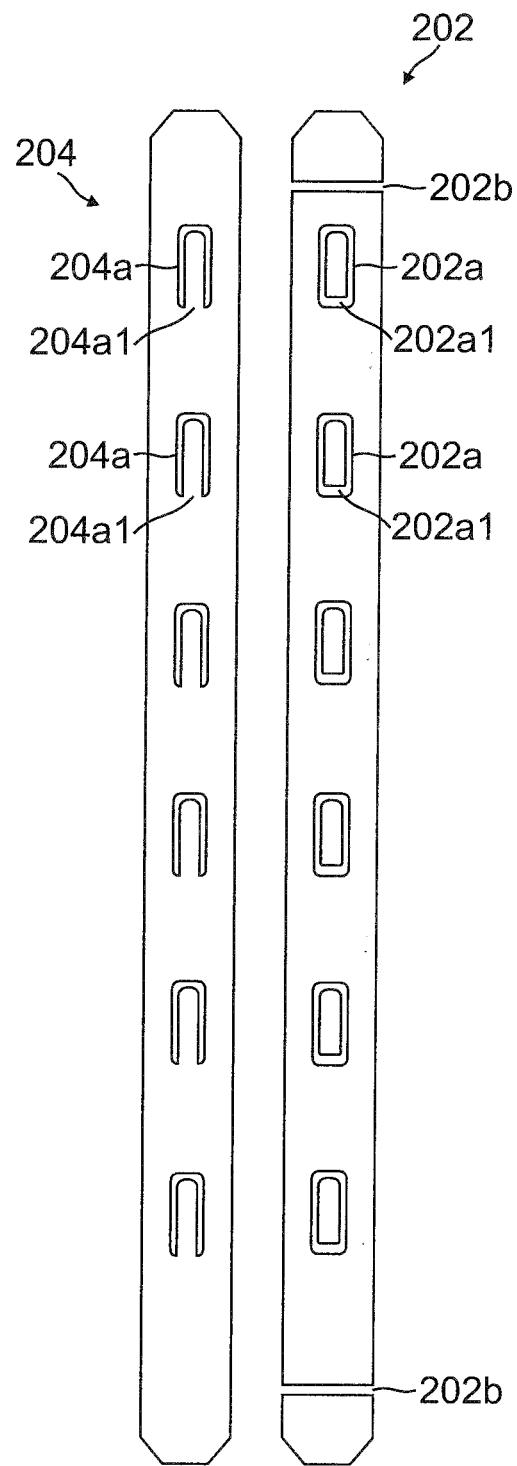
FIG. 4 is a top view illustrating two masks for etching the alignment comb of FIG. 3 according to an embodiment of the present invention.

FIG. 4 is a drawing illustrating first and second masks 202 and 204 for etching the alignment comb 102 according to an embodiment of the present invention. In FIG. 4, the first mask 202 has a number of first etching apertures 202a corresponding in position to the fingers 102a (see FIG. 3), and two slots 202b corresponding in position to the tab protrusions 102b (see FIG. 3) of the alignment comb 102. The second mask 204 has a number of second etching apertures 204a corresponding in position to the fingers 102a. The first mask 202 and the second mask 204 are placed on opposite sides of a substantially flat material (e.g., stainless steel or other suitable materials) for forming the alignment comb 102 by etching the flat material through the first mask 202 and the second mask 204. When placed on opposite sides of the flat material, the first etching apertures 202a of the first mask 202 overlap the second etching apertures 204a of the second mask 204. However, the first etching apertures 202a and the second etching apertures 204a have different shapes. In FIG. 4, each of the first etching apertures 202a has a portion 202a1 that exposes the bent portion 114 (see FIG. 3) of the corresponding finger 102a. Therefore, during etching, the bent portions 114 are partially etched through the mask 202 while the mask 204 protects the opposite side of the alignment comb 102 at locations 204a1. Similarly, portions of the flat material for forming the alignment comb 102 corresponding in position to the slots 202b will be partially etched to form bending or forming lines such that the tab protrusions 102b can be more precisely formed.

Figures 5A, 5B:
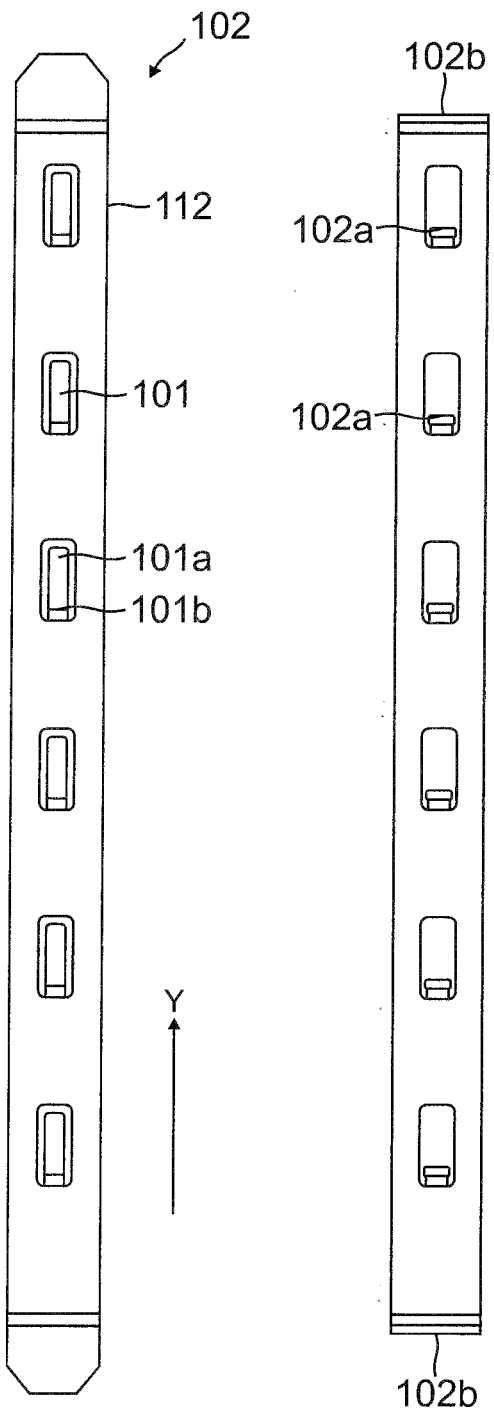
FIGS. 5(a) and 5(b) are plan views of an alignment comb after etching and forming, respectively, according to an embodiment of the present invention.

FIG. 5 is a drawing showing a plan view of an alignment comb 102 after etching (a) and forming (b). After etching, the alignment comb 102 (a) is still flat with an elongated body 112 and a number of tab protrusions 101 respectively cantilever-connected with a central portion of the elongated body 112. The tab protrusions 101 are spaced apart in an alignment direction (e.g., Y direction in FIG. 5). Each of the tab protrusions 101 has a floating distal end 101a and a proximal end 101b connected to the elongated body 112, and the proximal end 101b has a thickness that is less than that of the elongated body 112. FIG. 5(b) shows the alignment comb 102 with the tab protrusions 101 bent in a direction substantially perpendicular to the elongated body 112 to form the fingers 102a. The ends of the elongated body are also bent in opposite directions to form the tab protrusions 102b of the alignment comb 102.

Figure 6:
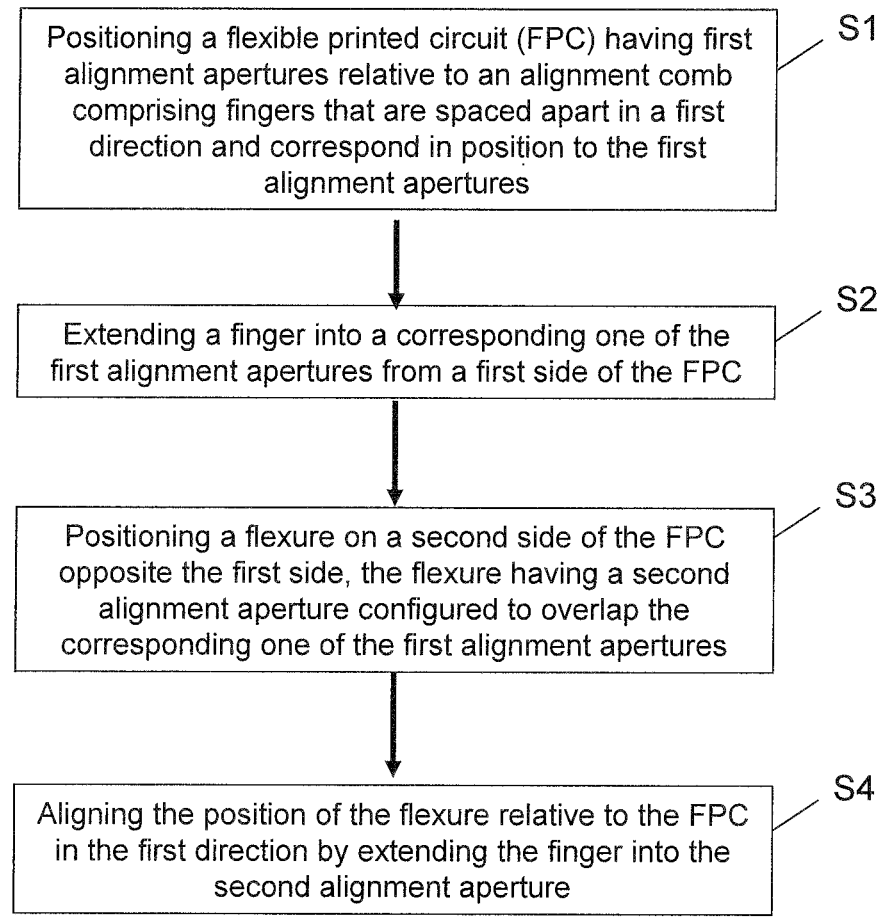
FIG. 6 is a flowchart illustrating a method for assembling a subassembly of a head stack assembly using an alignment comb according to an embodiment of the present invention.

FIG. 6 is a flowchart illustrating a method for assembling a subassembly of a head stack assembly for a hard drive according to an embodiment of the present invention. In step S1, a flexible printed circuit (FPC) having a number of first alignment apertures is positioned relative to an alignment comb including a number of fingers that are spaced apart in a first direction and correspond in position to the first alignment apertures. In step S2, a finger of the number of fingers extends into a corresponding one of the first alignment apertures from a first side of the FPC. In step S3, a flexure is positioned on a second side of the FPC opposite the first side, the flexure having a second alignment aperture configured to overlap the corresponding one of the first alignment apertures. In step S4, the position of the flexure relative to the FPC is aligned in the first direction by extending the finger into the second alignment aperture.

Figure 7:
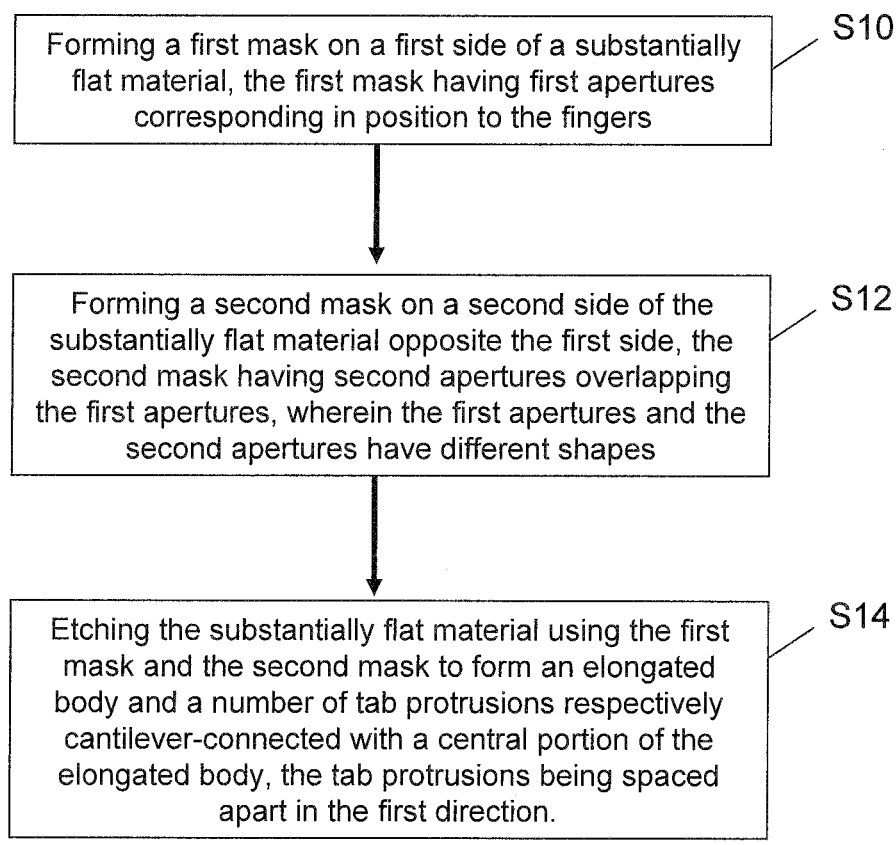
FIG. 7 is a flowchart illustrating a method for fabricating an alignment comb according to an embodiment of the present invention.

FIG. 7 is a flowchart illustrating a method for fabricating an alignment comb including a number of fingers spaced apart in a first direction (e.g., an alignment direction) according to an embodiment of the present invention. In step S10, a first mask is formed on a first side of a substantially flat material, the first mask having a number of first apertures corresponding in position to the fingers. In step S12, a second mask is formed on a second side of the substantially flat material opposite the first side, the second mask having a number of second apertures overlapping the first apertures, wherein the first apertures and the second apertures have different shapes. In step S14, the substantially flat material is etched using the first mask and the second mask to form an elongated body and a number of tab protrusions respectively cantilever-connected with a central portion of the elongated body, the plurality of tab protrusions being spaced apart in the first direction.

In the above described embodiments, the process or method can perform the sequence of actions in a different order. In another embodiment, the process or method can skip one or more of the actions. In other embodiments, one or more of the actions are performed simultaneously or concurrently. In some embodiments, additional actions can be performed.

While the present invention has been particularly shown and described with reference to exemplary embodiments thereof, it will be understood by those of ordinary skill in the art that various changes in form and details may be made therein without departing from the spirit and scope of the present invention as defined by the following claims and their equivalents.

What is claimed is:

1. A subassembly of a head stack assembly for a hard disk drive, comprising:

a flexible printed circuit (FPC) having a plurality of first apertures;

a flexure configured to be coupled to the FPC, the flexure having a second aperture configured to overlap a corresponding one of the first apertures; and an alignment comb comprising a plurality of fingers configured to align the FPC with the flexure, the plurality of fingers being spaced apart in a first direction and a finger of the plurality of fingers configured to extend into the corresponding one of the first apertures and the second aperture.

2. The subassembly of claim 1, wherein each of the plurality of fingers is retained in the second aperture by an interference fit.

3. The subassembly of claim 1, wherein a width of the second aperture in the first direction is smaller than a width of a corresponding one of the plurality of fingers.

4. The subassembly of claim 1,
wherein the alignment comb comprises an elongated body extending in the first direction, a first tab protrusion at a proximal end of the elongated body, and a second tab protrusion at a distal end of the elongated body, wherein the first tab protrusion and the second tab protrusion protrude from the elongated body in a second direction that is substantially perpendicular to the first direction, and wherein the plurality of fingers protrude from the elongated body between the first tab protrusion and the second tab protrusion in the second direction.

5. The subassembly of claim 4, wherein thicknesses of the first tab protrusion and the second tab protrusion are larger than a thickness of the elongated body.

6. The subassembly of claim 4, wherein each of the plurality of fingers is connected to the elongated body via a bend portion, and the bend portion has a thickness less than that of the elongated body.

7. The subassembly of claim 4,
wherein the FPC has a plurality of third apertures, and the first tab protrusion and the second tab protrusion are respectively inserted into the third apertures, and wherein the plurality of third apertures are configured to retain the first tab protrusion and the second tab protrusion therein.

8. The subassembly of claim 1, wherein the flexure comprises a plurality of flexures spaced apart in the first direction, each comprising a second aperture configured to overlap a corresponding one of the first apertures.

9. The subassembly of claim 1, wherein the plurality of fingers have substantially a same shape and are oriented in a second direction substantially perpendicular to the first direction.

10. The subassembly of claim 9, wherein the alignment comb comprises an elongated body extending in the first direction, and the plurality of fingers are formed by protruding tabs of the elongated body bent toward the second direction.

11. The subassembly of claim 1, wherein each of the plurality of fingers has a thickness between about 50 µm to about 200 µm, inclusive.

12. The subassembly of claim 11, wherein each of the plurality of fingers has a thickness of about 100 µm.

13. The subassembly of claim 1, further comprising a support member between the FPC and the alignment comb, the support member having a plurality of third apertures corresponding in position to the first apertures and the second aperture.

14. The subassembly of claim 1, wherein the alignment comb comprises metal.

15. The subassembly of claim 14, wherein the alignment comb comprises stainless steel.

16. The subassembly of claim 1, further comprising a rotary actuator assembly including a body portion, wherein the body portion has a cavity configured to receive the alignment comb.

17. A method for assembling a subassembly of a head stack assembly for a hard drive, the method comprising:
positioning a flexible printed circuit (FPC) having a plurality of first apertures relative to an alignment comb comprising a plurality of fingers that are spaced apart in a first direction and correspond in position to the first apertures;

extending a finger of the plurality of fingers into a corresponding one of the plurality of first apertures from a first side of the FPC;

positioning a flexure on a second side of the FPC opposite the first side, the flexure having a second aperture configured to overlap the corresponding one of the first apertures; and aligning the position of the flexure relative to the FPC in the first direction by extending the finger into the second aperture.

18. The method of claim 17, further comprising:
placing a support member between the FPC and the alignment comb, the support member having a plurality of third apertures corresponding in position to the first apertures and the second aperture, wherein the flexure comprises a plurality of flexures spaced apart in the first direction, and wherein the extending a corresponding one of the plurality of fingers into the second aperture comprises extending each of the plurality of fingers into a corresponding one of the first apertures, a corresponding one of the second apertures, and a corresponding one of the third apertures.

19. The method of claim 17, wherein the corresponding one of the plurality of fingers is retained in the second aperture by an interference fit.

20. The method of claim 17, wherein a width of the second aperture in the first direction is smaller than a width of the corresponding one of the plurality of fingers.

21. The method of claim 17, further comprising attaching the subassembly to a rotary actuator assembly including a body portion, wherein the body portion has a cavity configured to receive the alignment comb.

22. The method of claim 17,
wherein the alignment comb comprises a first tab protrusion and a second tab protrusion both extending in the same direction as the plurality of fingers in a second direction that is substantially perpendicular to the first direction, and wherein the FPC has a plurality of third apertures, the method further comprising inserting the first tab protrusion and the second tab protrusion into the third apertures, respectively, wherein the plurality of third apertures are configured to retain the first tab protrusion and the second tab protrusion therein.

23. The method of claim 17, further comprising electrically coupling a plurality of pads of the flexure with a plurality of pads of the FPC.

24. A method for fabricating an alignment comb comprising a plurality of fingers spaced apart in a first direction, the method comprising:

forming a first mask on a first side of a substantially flat material, the first mask having a plurality of first apertures corresponding in position to the plurality of fingers;

forming a second mask on a second side of the substantially flat material opposite the first side, the second mask having a plurality of second apertures overlapping the plurality of first apertures, wherein the first apertures and the second apertures have different shapes; and etching the substantially flat material using the first mask and the second mask to form an elongated body and a plurality of tab protrusions respectively cantilever-connected with a central portion of the elongated body, the plurality of tab protrusions being spaced apart in the first direction.

25. The method of claim 24, wherein each of the tab protrusions has a floating distal end and a proximal end connected to the elongated body, and the proximal end has a thickness that is less than that of the elongated body.

26. The method of claim 25, further comprising bending the plurality of tab protrusions at the proximal ends toward a second direction substantially perpendicular to the first direction to form the plurality of fingers.

27. The method of claim 24, wherein the first mask has a plurality of third apertures, the method further comprising etching portions of the elongated body on the first side respectively located at ends of the elongated body using the plurality of third apertures, while protecting portions of the elongated body on the second side corresponding in position to the third apertures by using the second mask.

28. The method of claim 27, further comprising bending the ends of the elongated body in opposite directions at the etched portions.

* * * * *